(12) United States Patent
Connor et al.

(10) Patent No.: US 11,036,531 B2
(45) Date of Patent: Jun. 15, 2021

(54) TECHNIQUES TO MIGRATE A VIRTUAL MACHINE USING DISAGGREGATED COMPUTING RESOURCES

(71) Applicant: Intel Corporation, Santa Clara, CA (US)

(72) Inventors: Patrick Connor, Beaverton, OR (US); James R. Hearn, Hillsboro, OR (US); Scott P. Dubal, Beaverton, OR (US); Andrew J. Herdrich, Hillsboro, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 15/635,124

(22) Filed: Jun. 27, 2017

(65) Prior Publication Data

US 2018/0373553 A1 Dec. 27, 2018

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ........ G06F 9/45558; G06F 2009/4557; G06F 2009/45583; G06F 2009/45595
See application file for complete search history.

(56) References Cited

U.S. PATENT DOCUMENTS

| | | | |
|---|---|---|---|
| 8,365,169 B1* | 1/2013 | Watson | G06F 9/4856 718/1 |
| 9,329,882 B2* | 5/2016 | Garza | G06F 9/5077 |
| 2012/0137287 A1* | 5/2012 | Pang | G06F 9/45558 718/1 |
| 2014/0189041 A1* | 7/2014 | Mashtizadeh | G06F 15/17331 709/213 |
| 2015/0378759 A1* | 12/2015 | Pershin | G06F 9/45558 718/1 |
| 2016/0054922 A1* | 2/2016 | Awasthi | G06F 3/061 711/103 |
| 2017/0024246 A1* | 1/2017 | Gopalan | G06F 3/067 |
| 2019/0207909 A1* | 7/2019 | Meirosu | H04L 63/029 |

* cited by examiner

*Primary Examiner* — Jacob D Dascomb
(74) *Attorney, Agent, or Firm* — Compass IP Law PC

(57) ABSTRACT

Examples may include techniques to live migrate a virtual machine (VM) using disaggregated computing resources including compute and memory resources. Examples include copying data between allocated memory resources that serve as near or far memory for compute resources supporting the VM at a source or destination server in order to initiate and complete the live migration of the VM.

28 Claims, 12 Drawing Sheets

700

---

INITIATE A LIVE MIGRATION OF A VM SUPPORTED BY ONE OR MORE FIRST PROCESSING ELEMENTS HAVING AN ALLOCATED PORTION OF A FIRST MEMORY, THE ONE OR MORE FIRST PROCESSING ELEMENTS AND THE FIRST MEMORY HOSTED BY THE SOURCE SERVER, THE LIVE MIGRATION TO CAUSE THE VM TO BE SUPPORTED BY ONE OR MORE SECOND PROCESSING ELEMENTS HAVING AN ALLOCATED PORTION OF A SECOND MEMORY, THE ONE OR MORE SECOND PROCESSING ELEMENTS AND THE SECOND MEMORY HOSTED BY A DESTINATION SERVER
702

---

COPY VM MEMORY PAGES TO AN ALLOCATED PORTION OF A THIRD MEMORY, THE VM MEMORY PAGES ASSOCIATED WITH THE VM EXECUTING AN APPLICATION WHILE SUPPORTED BY THE ONE OR MORE FIRST PROCESSING ELEMENTS, THE THIRD MEMORY ARRANGED TO SERVE AS A FAR MEMORY TO THE ONE OR MORE FIRST PROCESSING ELEMENTS AND THE ONE OR MORE SECOND PROCESSING ELEMENTS WHILE THE FIRST AND SECOND MEMORIES ARE ARRANGED TO SERVE AS RESPECTIVE NEAR MEMORIES FOR RESPECTIVE ONE OR MORE FIRST AND SECOND PROCESSING ELEMENTS
704

---

INDICATE TO THE DESTINATION SERVER THAT THE VM MEMORY PAGES HAVE BEEN COPIED TO THE ALLOCATED PORTION OF THE THIRD MEMORY TO CAUSE THE VM MEMORY PAGES TO BE COPIED TO THE ALLOCATED PORTION OF THE SECOND MEMORY, THE VM MEMORY PAGES INCLUDING STATE INFORMATION FOR USE BY THE ONE OR MORE SECOND PROCESSING ELEMENTS TO SUPPORT THE VM'S EXECUTION OF THE APPLICATION AT THE DESTINATION SERVER
706

---

RECEIVE AN INDICATION THAT THE STATE INFORMATION HAS BEEN USED TO LOAD A PROCESSING STATE TO ENABLE THE ONE OR MORE SECOND PROCESSING ELEMENTS TO SUPPORT THE VM'S EXECUTION OF THE APPLICATION
708

---

CAUSE DATA TRAFFIC TO BE ROUTED FOR PROCESSING BY THE APPLICATION EXECUTED BY THE VM SUPPORTED BY THE ONE OR MORE SECOND PROCESSING ELEMENTS
710

FIG. 7

Storage Medium 800

Computer Executable Instructions for 700

RECEIVE, AT A DESTINATION SERVER, AN INDICATION FROM A SOURCE SERVER THAT A LIVE MIGRATION HAS BEEN INITIATED TO CAUSE A VM SUPPORTED BY ONE OR MORE FIRST PROCESSING ELEMENTS HAVING AN ALLOCATED PORTION OF A FIRST MEMORY, THE ONE OR MORE FIRST PROCESSING ELEMENTS AND THE FIRST MEMORY HOSTED BY THE SOURCE SERVER, THE LIVE MIGRATION TO CAUSE THE VM TO BE SUPPORTED BY ONE OR MORE SECOND PROCESSING ELEMENTS HAVING AN ALLOCATED PORTION OF A SECOND MEMORY, THE ONE OR MORE SECOND PROCESSING ELEMENTS AND THE SECOND MEMORY HOSTED BY THE DESTINATION SERVER
*1002*

RECEIVE A REFERENCE TO AN ALLOCATED PORTION OF A THIRD MEMORY TO WHICH VM MEMORY PAGES HAVE BEEN COPIED FROM THE ALLOCATED PORTION OF THE FIRST MEMORY, THE VM MEMORY PAGES ASSOCIATED WITH THE VM EXECUTING AN APPLICATION WHILE SUPPORTED BY THE ONE OR MORE FIRST PROCESSING ELEMENTS, THE THIRD MEMORY ARRANGED TO SERVE AS A FAR MEMORY TO THE ONE OR MORE FIRST PROCESSING ELEMENTS AND THE ONE OR MORE SECOND PROCESSING ELEMENTS WHILE THE FIRST AND SECOND MEMORIES ARE ARRANGED TO SERVE AS RESPECTIVE NEAR MEMORIES FOR RESPECTIVE ONE OR MORE FIRST AND SECOND PROCESSING ELEMENTS
*1004*

CAUSE THE VM MEMORY PAGES TO BE COPIED TO THE ALLOCATED PORTION OF THE SECOND MEMORY, THE VM MEMORY PAGES INCLUDING STATE INFORMATION FOR USE BY THE ONE OR MORE SECOND PROCESSING ELEMENTS TO SUPPORT THE VM'S EXECUTION OF THE APPLICATION
*1006*

CAUSE AN INDICATION TO BE SENT TO THE SOURCE SERVER THAT THE STATE INFORMATION HAS BEEN USED TO LOAD A PROCESSING STATE TO ENABLE THE ONE OR MORE SECOND PROCESSING ELEMENTS TO SUPPORT THE VM'S EXECUTION OF THE APPLICATION
*1008*

CAUSE DATA TRAFFIC TO BE RECEIVED FOR PROCESSING BY THE APPLICATION EXECUTED BY THE VM SUPPORTED BY THE ONE OR MORE SECOND PROCESSING ELEMENTS
*1010*

*FIG. 10*

Storage Medium 1100

Computer Executable
Instructions for 1000

TECHNIQUES TO MIGRATE A VIRTUAL MACHINE USING DISAGGREGATED COMPUTING RESOURCES

TECHNICAL FIELD

Examples described herein are generally related to virtual machine (VM) migration between nodes, servers or computing platforms in a network.

BACKGROUND

Live migration for virtual machines (VMs) hosted by compute nodes, sleds, servers or computing platforms is an important feature for a system such as a datacenter to enable fault-tolerant capabilities, flexible resource management or dynamic workload rebalancing. Live migration may include migrating a VM hosted by a source server to be hosted by a destination server. The migration of the VM may be over a network connection between the source and destination servers. The migration may be considered a "live" migration if one or more applications being executed by the migrated VM continue to be executed by the VM during migration between host servers. The migration may be considered an "offline" migration if the one or more applications are suspended on the original or source server and then resumed on the destination server after migration is complete.

BRIEF DESCRIPTION OF THE DRAWINGS

FIG. 7 illustrates an example of a first logic flow.
FIG. 8 illustrates an example of a first storage medium
FIG. 10 illustrates an example of a second logic flow.
FIG. 11 illustrates an example of a second storage medium.

DETAILED DESCRIPTION

Figure 1:
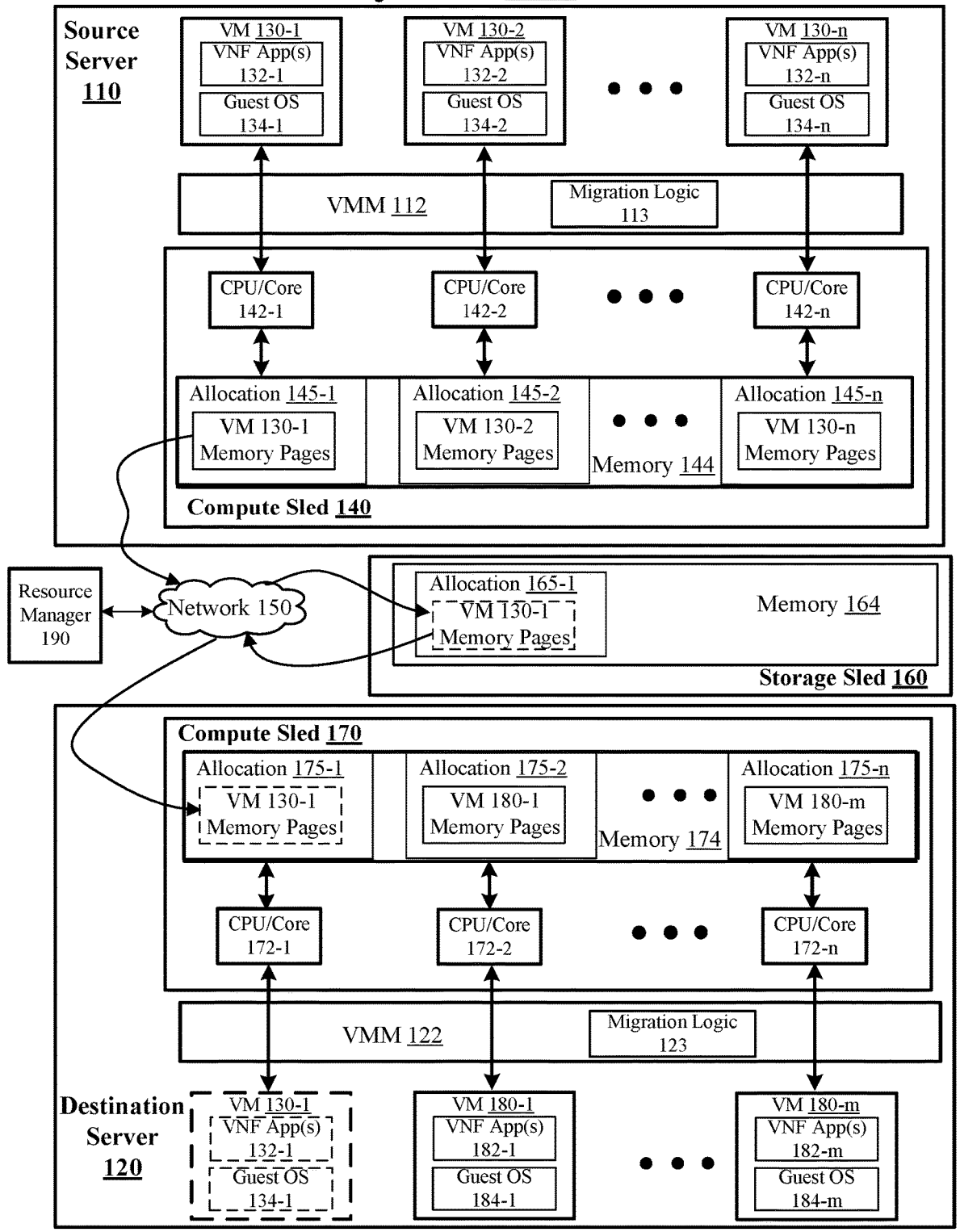
FIG. 1 illustrates an example system.

As contemplated in the present disclosure, live migration of a VM from a source server to a destination service may be considered as live if an application and/or guest operating system (OS) kernel being executed by the VM continues to be executed by the VM during migration or considered as offline if the one or more applications are suspended during the migration and resumed at the destination server after migration is complete. Typically, VM hypervisors or VM managers (VMMs) separately supported by respective source/destination servers may be arranged to coordinate live or offline migration of VMs between servers.

A large portion of a live migration of a VM may be VM state information that includes memory used by the VM while executing one or more applications. In some examples, live migration may involve a two-phase process. A first phase may be a pre-memory copy phase that includes copying memory (e.g., volatile memory) allocated to a VM for executing one or more applications and changing allocated memory (e.g., dirty pages) from the original or source server to the destination server while the VM is still executing the one or more applications or the VM is still running on the source server. The first or pre-memory copy phase may continue until remaining dirty pages at the source server fall below a threshold. The second phase may include a final copy phase that quickly copies remaining state information (e.g., remaining dirty pages, a processor state or an input/output state) to the destination server, and then quickly loads this remaining state information of the VM at the destination server such that little to no disruption is placed on the one or more applications. The copying of information for the two phases may be through a network connection maintained between source and destination servers.

The amount of time spent in the final copy phase is important as the one or more applications being executed by the VM may be briefly halted for this period of time. Thus, any services being provided while executing the application may be temporarily unresponsive. The amount of time spent in the pre-memory copy phase is also important since this phase may have the greatest time impact on the overall time to complete the live migration. If the pre-memory copy phase takes too long or requires too many copy events it may time out or hit a threshold number of copy events. Timing out of hitting the threshold may be referred to as "failure to merge". In operating scenarios were the one or more application executed by a migrated VM may support services provided by a software defined network (SDN) and/or a telecommunication network (e.g., for 4G or 5G wireless communications), data/control packets may be arriving at the VM at a fast rate. A high latency migration may be detrimental for such operating scenarios and may lead to unacceptable disruptions and/or a poor user experience for users of services provided by SDNs and/or telecommunication networks.

In some examples, if an attempt for a live migration of a VM results in a failure to merge, the one or more applications executing at the VM may be paused and offline migration may be used instead. Offline migration is less desirable due to a longer duration of service interruption.

According to some examples, virtual network functions (VNFs) supported by one or more applications executed by respective VMs may be utilized in operating scenarios involving European Telecommunications Standards Institute (ETSI) network function virtualization (NFV) or an SDN. VNFs in an NFV or SDN may process data/control packets at a high rate and may run in Active-Active or Active-Passive modes for high availability (HA) and failover/fault tolerant usages. Uptime for the one or more applications supporting VNFs is important in these operating scenarios and live migration may be difficult to accomplish without data/control packet loss. This may cause service providers to move away from an SDN and/or an NFV usage model and move back to usage models based on specialized and/or proprietary-based hardware.

FIG. 1 illustrates an example system 100. In some examples, as shown in FIG. 1, system 100 includes a source server 110 coupled through a network 150 with a destination server 120. For these examples, system 100 may be part of a datacenter and network 150 may represent elements of an internal network that communicatively couples a plurality of servers included in the datacenter such as communicatively coupling source server 110 with various other servers or nodes that includes destination server 120. These interconnected servers or nodes may provide network services to one or more clients or customers as part of an SDN or an ETSI NFV infrastructure.

According to some examples, source server 110 and destination server 120 may each be a node composed of disaggregated resources (i.e., a node comprised of compute resources from a compute sled, storage resources from a storage sled, accelerator resources from an accelerator sled) in a datacenter to support VMs separately executing one or more VNF applications as part of providing network services to clients or customers. For example, VMs 130-1 to 130-$n$ (where "n" represents any whole, positive integer greater than 2) and VMs 180-1 to 180-$m$ (where "m" represents any whole, positive integer greater than 1) may be supported by composed computing resources associated with respective source server 110 and destination server 120. VMs 130-1 to 130-$n$ at source server 110 may be managed or controlled by a VM manager (VMM) or hypervisor such as VMM 112. VMs 180-1 to 180-$m$ at destination server 120 may be managed or controlled by VMM 122. In other examples, source server 110 or destination server 120 may each be configured as a more conventional server having the various above-mentioned computing resources contained within a same physical enclosure or container.

In some examples, as shown in FIG. 1, at least some of the composed computing resources for source server 110 may be located at a compute sled 140 and may include processing elements such as CPU/cores 142-1 to 142-$n$ having separately allocated portions of memory 144 for use in supporting VMs 130-1 to 130-$n$. Allocated portions of memory 144 such as allocations 145-1 to 145-$n$ may be accessible to respective CPU/cores 142-1 to 142-$n$ and may maintain memory pages for respectively supported VMs 130-1 to 130-$n$. The memory pages for VMs 130-1 to 130-$n$ may include respective state information for one or more VNF applications App(s)) 132-1 to 132-$n$ as well as state information for respective guest operation systems (OSs) 134-1 to 134-$n$. The state information for a given VM may reflect a current state of the VM while executing one or more VNF applications to fulfill a workload as part of providing a network service. The network service may include, but is not limited to, a database network service, a website hosting network service, a routing network service, an e-mail network service, a firewalling service, a domain name service (DNS), a caching service, a network address translation (NAT) service or virus scanning network service.

According to some examples, as shown in FIG. 1, at least some composed computing resources for destination server 120 may be located at a compute sled 170 and may include CPU/cores 172-1 to 172-$n$ having an allocated portion of memory 174 for use in supporting VMs 180-1 to 180-$m$ and for use to support a migrated VM 130-1. Allocated portions of memory 174 such as allocations 175-1 to 175-$n$ may be accessible to respective CPU/cores 142-1 to 142-$n$ and may maintain memory pages for respectively supported VM 130-1 and VMs 180-2 to 180-$m$. The memory pages for VM 130-1 and VMs 180-1 to 180-$m$ may include respective state information for one or more VNF App(s) 132-1 and VNF App(s) 182-1 to 182-$m$ as well as state information for respective guest OS 134-1 and guest OSs 184-1 to 184-$m$. The state information may reflect an operating state of VM 130-1 and VMs 180-1 to 180-$m$ while executing respective VNF App(s) 132-1 and VNF App(s) 182-1 to 182-$m$ to fulfill a workload as part of providing a network service such as those mentioned previously for source server 110.

In some examples, CPUs/cores 142-1 to 142-$n$ or CPUs/cores 172-1 to 172-$n$ may represent, either individually or collectively, various commercially available processors, including without limitation an Intel® Atom®, Celeron®, Core (2) Duo®, Core i3, Core i5, Core i7, Itanium®, Pentium®, Xeon® or Xeon Phi® processors; and similar processors.

In some examples, as shown in FIG. 1, a storage sled 160 may include a memory 164. As described more below, storage sled 160 may represent another portion of composed computing resources arranged to support VMs at source server 110 or at destination server 120. Storage sled 160, for example, may represent a disaggregated computing resource that may be located in different physical locations in relation to compute sled 140 of source server 110 or compute sled 170 of destination server 120. For example, storage sled 160 may be maintained in a first cabinet in a datacenter while compute sleds 140 and 170 may be located in respective second or third cabinets of the datacenter. Alternatively, storage sled 160, compute sled 140 and compute sled 170 may be located in a same cabinet but may be located in separate racks, shelfs or levels of the same cabinet. In either of these examples, storage sled 160 may be communicatively coupled with compute sleds 140 and 170 via network 150.

According to some examples, a resource manager 190 may include logic and/or features to facilitate composition of disaggregated computing resources as shown in FIG. 1 for system 100. The logic and/or features of resource manager 190 may allocate compute sled 140 from among a plurality of compute sleds in a datacenter to source server 110 and allocate compute sled 170 from among the plurality of compute sleds to destination server 120. Although not shown in FIG. 1, resource manager 190 may allocate other compute resources such as, but not limited to, networking resources (e.g., physical ports, network switching capabilities, network interface cards, accelerators, act.). In some examples, memory 144 and memory 174 at respective compute sleds 140 may be types of relatively fast access memory placed in close proximity to respective CPUs/cores 142-1 to 142-$n$ or 172-1 to 172-$m$ to minimize latency. The types of relatively fast access memory included in memory 144 or memory 175 may include, but are not limited to, volatile types of memory such as dynamic random access memory (DRAM) or static random access memory (SRAM). For these examples, separate portions of memory 144 shown in FIG. 1 as allocations 145-1 to 145-$n$ may be allocated to VMs 130-1 to 130-$n$ as a type of system memory for use by CPUs/cores 142-1 to 142-$n$ to support these VMs at source server 110. Also, separate portions of memory 174 shown in FIG. 1 as allocations 175-2 to 175-$n$ may be allocated to VMs 180-1 to 180-$n$ as a type of system memory for use by CPUs/cores 142-1 to 142-$n$ to support these VMs at destination server 120.

In some examples, storage sled 160 may be allocated by logic and/or features of resource manager 190 to support VMs hosted by servers in the datacenter such as source server 110 and destination server 120. For these examples, memory 164 may include types of memory capable of providing additional system memory to augment memory 144 at compute sled 140 or augment memory 174 at compute sled 170. Memory 164 may also include types of memory capable of providing storage capabilities for the VMs supported by source server 110 or destination server 120. These types of memory may include volatile memory, non-volatile memory or combination of volatile and non-volatile types of memory. Volatile types of memory may include, but are not limited to, DRAM, SRAM, thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above.

According to some examples, the relatively fast types of memory included in memory 144 at compute sled 140 or included in memory 174 of compute sled 170 may be allocated to VMs as part of a two-level memory (2LM) architecture that may classify memory 144 and memory 174 as near memory. Memory 164 included in storage sled 160 may be allocated to support the VMs as part of the 2LM architecture that may classify memory 164 as far memory.

Memory capacities or size of memory 144 or memory 174 used in a 2LM architecture as near memory may be sized for optimal, low latency performance that depends on various factors. These factors may vary for different VNF applications being executed by each VM and portions of memory 144 or memory 174 may be allocated to fulfill a workload as part of providing a network service. For example, DRAM or SRAM included in memory 144 or memory 174 may have capacities of a few gigabytes (GB) to hundreds of GBs. Typically, due to operating costs associated with energy consumption, cooling and memory densities, near memory in a 2LM architecture may have a substantially lower memory capacity compared to far memory. Also, since latency intensive memory needs may be primarily met by near memory, far memory may not need to be in close proximity to compute sled 140 and may also include higher latency types of memory such as various types of non-volatile memory (e.g., 3-D cross-point memory). These various types of non-volatile memory may have lower operating costs associated with energy consumption and cooling and may also have substantially higher memory densities (e.g., more bytes per area of a memory chip). From a perspective of a given VNF application, VM, guest OS or VMM, memory 164 may be allocated as both byte addressable RAM (e.g., part of system memory) and as block addressable storage (e.g., as a solid state drive (SSD)).

In some examples, migration logic 113 of VMM 112 at source server 110 and migration logic 123 of VMM 122 may separately include logic and/or features capable of facilitating a live migration of a VM from source server 110 to destination server 120. For example, migration logic 113 and migration logic 123 may facilitate the live migration of VM 130-1 from source server 110 to destination server 120 via use of a 2LM architecture that has memory 144 and memory 174 as near memory and memory 164 as far memory. As described more below, various schemes may utilize this 2LM architecture to reduce live migration time and minimize, if not eliminate, offline migration that may result if copy phases for moving VM memory pages between source and destination servers result in a failure to merge during a live migration.

According to some examples, as shown in FIG. 1, VM 130-1 may be live migrated from source server 110 to destination server 120 via use of these various schemes utilizing a 2LM architecture that has memory 144 and memory 174 arranged as near memory and memory 164 arranged as far memory. These various schemes may include at least temporarily allocating portions of memory 144 (e.g., allocation 145-1), memory 164 (allocation 165-1) and memory 174 (e.g., allocation 175-1) for at least temporarily storing VM 130-1 memory pages throughout the live migration process. As mentioned previously, VM 130-1 memory pages may include state information for VNF App(s) 132-1 and guest OS 134-1. The various schemes may accelerate live migration of VM 130-1 that may be initiated responsive to such reasons as load balancing, fog/edge computing, or system maintenance. The dash-lined boxes for VM 130-1 memory pages at memory 164 and memory 174 represent transient movement of these memory pages during live migration. Also, the dash-lined boxes for VM 130-1, VNF App(a) 132-1 and guest OS 134-1 represent a live migration of VM 130-1 to destination server 120 just before live migration is complete.

Figure 2:
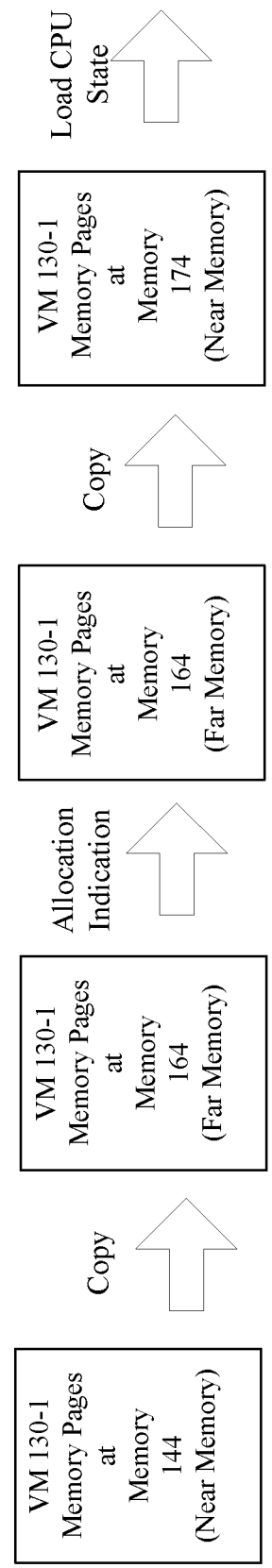
FIG. 2 illustrates an example first scheme.

FIG. 2 illustrates an example scheme 200. In some examples, scheme 200 may depict an example of how VM memory pages may move between a first near memory located with a first compute sled for a first server to far memory located at a storage sled and then to a second near memory located with a second compute sled at a second server in order to facilitate a live migration of a VM between the first and second servers. For these examples, VM 130-1 memory pages as mentioned above for FIG. 1 are shown as in FIG. 2 for example scheme 200.

According to some examples, resource manager 190 and/or management logic for system 100 may determine that VM 130-1 needs to be migrated from source server 110 to destination server 120 (e.g., for load balancing). As part of the live migration, migration logic 113 of VMM 112 may cause VM 130-1 memory pages at memory 144 to be copied to memory 164 while VM 130-1 continues to execute VNF App(s) 132-1 at source server 110 using compute sled 140. As mentioned above, memory 144 and memory 164 may be part of a 2LM architecture that has memory 144 serving as near memory and memory 164 serving as far memory. For these examples, resource manager 190 may have allocated a portion of memory 164 for use by VM 130-1 while executing one or more VNF App(s) 132-1 regardless of which server is hosting VM 130-1. After an initial copying of the VM 130-1 memory pages to memory 164, all memory page changes (dirty memory pages) will go directly to memory 164.

In some examples, resource manager 190 may also send an indication to migration logic 123 of VMM 122 at destination server 120 that VM 130-1 is to be live migrated to destination server 120. This indication, for example, may include a memory allocation indication to indicate that allocation 165-1 of memory 164 has been arranged to receive VM 130-1 memory pages from elements of source server 110 during the live migration. For example, VM 130-1 memory pages initially copied from allocation 145-1 of memory 144 and then storing subsequent memory page changes generated while the one or more VNF App(s) 132-1 continue to execute at source server 110. Migration logic 123 may then be able to copy VM 130-1 memory pages from memory 164 to allocation 175-1 of memory 174 maintained with compute sled 170 at destination server 120. Once VM 132-1 memory pages are copied to memory 174, the state information for VNF App(s) 132-1 and guest OS 134-1 may be used by CPU/core 172-1 to load a CPU state for execution of VNF App(s) by VM 130-1 at destination server 120. Migration logic 123 may then indicate to migration logic 113 that the CPU state has been loaded. Loading of the CPU state may indicate that VNF App(s) 132-1 can now be executed by VM 130-1 at destination server 120. Data traffic for processing by VNF App(s) 132-1 may then be rerouted to destination server 120. After the re-routing of the data traffic, VM 130-1 may be disabled at source server 110 and compute resources such as CPUs/Cores 142-1 may be reallocated to support other VMs. Live migration of VM 130-1 may now be deemed as completed.

Figure 3:
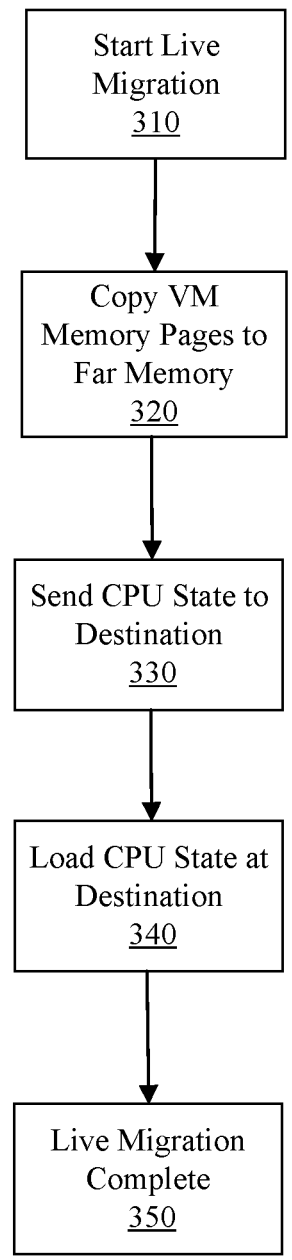
FIG. 3 illustrates an example first virtual machine (VM) flow.

FIG. 3 illustrates an example VM migration flow 300. In some examples, VM migration flow 300 may depict a logic flow for a VM migration between servers utilizing a 2LM architecture that includes use of near memory located with a compute sled at a source server and use of disaggregated memory as far memory as mentioned above for FIG. 1 and for scheme 200 shown in FIG. 2. For these examples, elements of system 100 such as, but not limited to, source server 110, destination server 120, VM 130-1, migration logic 113/123, compute sleds 140/170, storage sled 160 or resource manager 190 may be associated with and/or may implement at least portions of VM migration flow 300. Although examples are not limited to elements of system 100 being associated with and/or implementing at least portions of VM migration flow 300.

Beginning at block 310, a live migration of VM 130-1 from source server 110 to destination server 120 may be started or initiated. In some examples, as mentioned for scheme 200, resource manager 190 and/or management logic for system 100 may determine that VM 130-1 needs to be migrated from source server 110 to destination server 120 (e.g., for load balancing) and may start or initiate the live migration.

Moving to block 320, migration logic 113 may cause VM 130-1 memory pages stored in allocation 145-1 of memory 144 to be copied to allocation 165-1 of memory 164 at storage sled 160. Migration logic 113 may also cause VM 130-1 memory pages at memory 144 to be copied to memory 164 while VM 130-1 continues to execute VNF App(s) 132-1 at source server 110 using compute sled 140.

Moving to block 330, migration logic 123 at destination server 120 may receive an indication that VM 130-1 is to be migrated to destination server 120 supported by compute sled 170. Migration logic 123 may also receive an indication that VM 130-1 memory pages have been copied to memory 164 of storage sled 160 in order to send a CPU state to memory 174 of compute sled 170 at destination server 120. In some examples, VM 130-1 memory pages copied to allocation 165-1 at memory 164 may include state information for VNF App(s) 132-1 and guest OS 134-1 that may be associated with a CPU state for CPU/core 172-1 to support VM 130-1's executing of VNF App(s) 132-1 at destination server 120.

Moving to block 340, migration logic at destination server 120 may use the state information for VNF App(s) 132-1 included in VM 130-1's memory pages copied to allocation 165-1 at memory to load the CPU state for CPU/core 172-1 to support execution of VNF App(s) 132-1 by VM 130-1 at destination server 120

Moving to block 350, migration logic 123 may indicate to migration logic 113 that the CPU state has been loaded. As mentioned previously, loading of the CPU state may indicate that VNF App(s) 132-1 can now be executed by VM 130-1 at destination server 120. Data traffic for processing by VNF App(s) 132-1 may then be rerouted to destination server 120. Following the rerouting of the data traffic, live migration of VM 130-1 to destination server 120 may now be deemed as completed.

Figure 4:
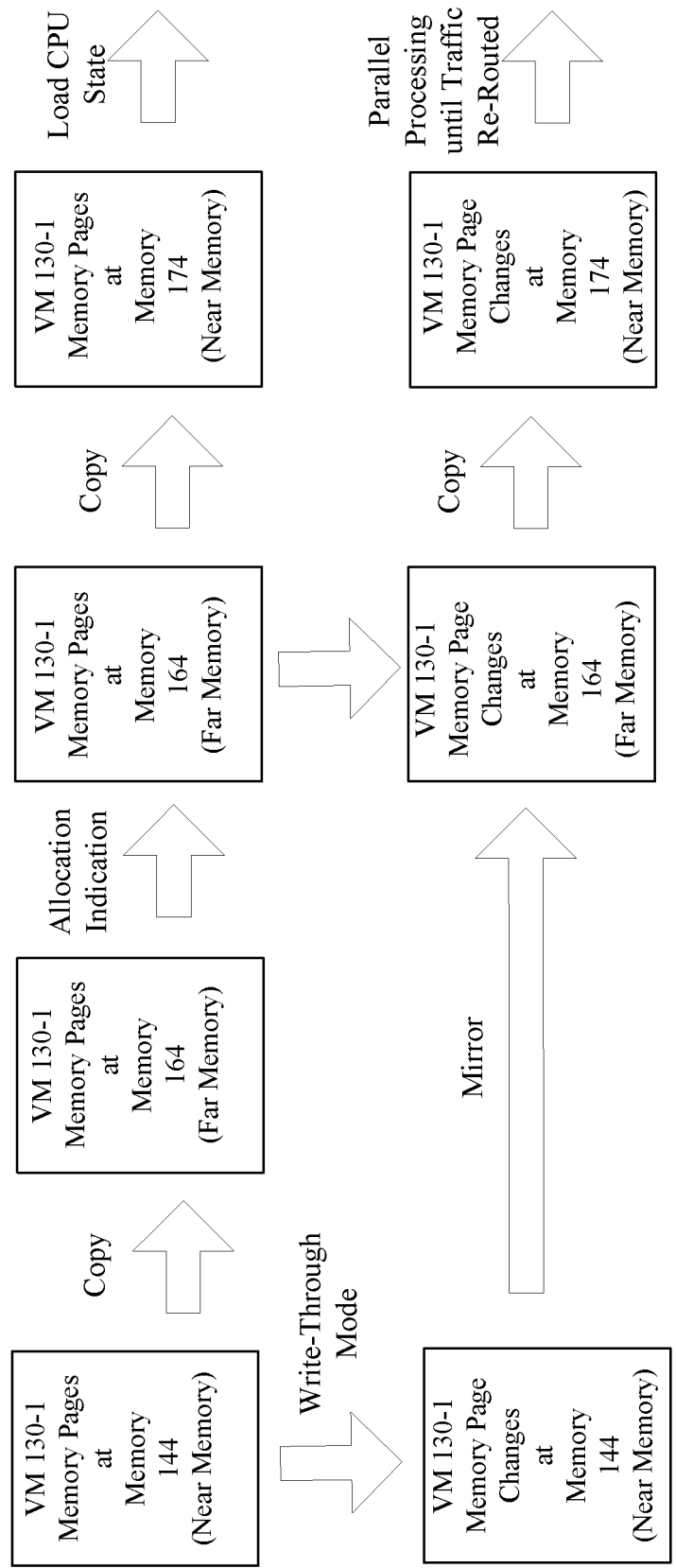
FIG. 4 illustrates an example second scheme

FIG. 4 illustrates an example scheme 400. In some examples, scheme 400 may depict another example of how VM memory pages may move between a first near memory located with a first compute sled for a first server to far memory located at a storage sled and then to a second near memory located with a second compute sled at a second server in order to facilitate a live migration of a VM between the first and second servers. Similar to scheme 200 described above for FIG. 2, VM 130-1 memory pages as mentioned above for FIG. 1 are shown as in FIG. 4 for example scheme 400. Scheme 400 may be implemented in situations where higher-performance is required and that utilizing a far memory as described above for scheme 200 and logic flow 300 to at least temporarily store dirty memory pages may result in an unacceptable increase in memory latency for the execution of one or more VNF applications by a VM 130-1 during a live migration. This may occur in situations where data/control packets may need to be processed at such a high rate that the increased memory latency may cause dirty memory pages to be generated at a faster rate than can be acceptably transferred between a first near memory at the first or source server and a far memory and then between the far memory and a second near memory at the second or destination server.

According to some examples, resource manager 190 and/or management logic for system 100 may determine that VM 130-1 needs to be migrated from source server 110 to destination server 120. For these examples, migration logic 113 may activate a write-through mode that may enable all writes or changes to VM 130-1 memory pages at memory 144 (dirty pages) to be visible in a substantially immediate manner in memory 164. Thus, as shown in FIG. 4 VM 130-1's memory pages may be copied to memory 164 and then memory page changes may be concurrently maintained in memory 144 and memory 164 while VM 130-1 executes VNF App(s) 132-1 at source server 110. This may keep a far memory image of VM 130-1's operating state up to date (e.g., similar to how a write-through mode at a redundant array of independent disk (RAID) controller may be implemented using onboard cache). Thus, subsequent or future VM 130-1 memory page changes are implicitly mirrored in memory 164.

In some examples, similar to scheme 200, resource manager 190 may also send an indication to migration logic 123 of VMM 122 at destination server 120 that VM 130-1 is to be live migrated to destination server 120. This indication, for example, may include a memory allocation indication to indicate that allocation 165-1 of memory 164 has been arranged to receive VM 130-1 memory pages from elements of source server 110 during the live migration. However, for scheme 400, resource manager 190 may indicate that parallel processing may occur after a CPU state is loaded and traffic to be processed is rerouted to destination server 120. VM 130-1 at destination server 130 may then begin executing VNF App(s) 132-1 in order to cache the most critical structures of VNF App(s) 132-1 and/or guest OS 134-1 to enable processing of data traffic early before the data traffic is routed to only destination server 120. According to some examples, routing infrastructure between source server 110 and destination server 120 may be configured using SDN methods that may include dropping processed packets from VM 130-1 at destination server 120 until the live migration is deemed as completed and a switch over to the destination server 120 is made. The caching of the most critical structures may allow VM 130-1 at destination server 120 to ramp up in a background mode in a substantially seamless manner.

Figure 5:
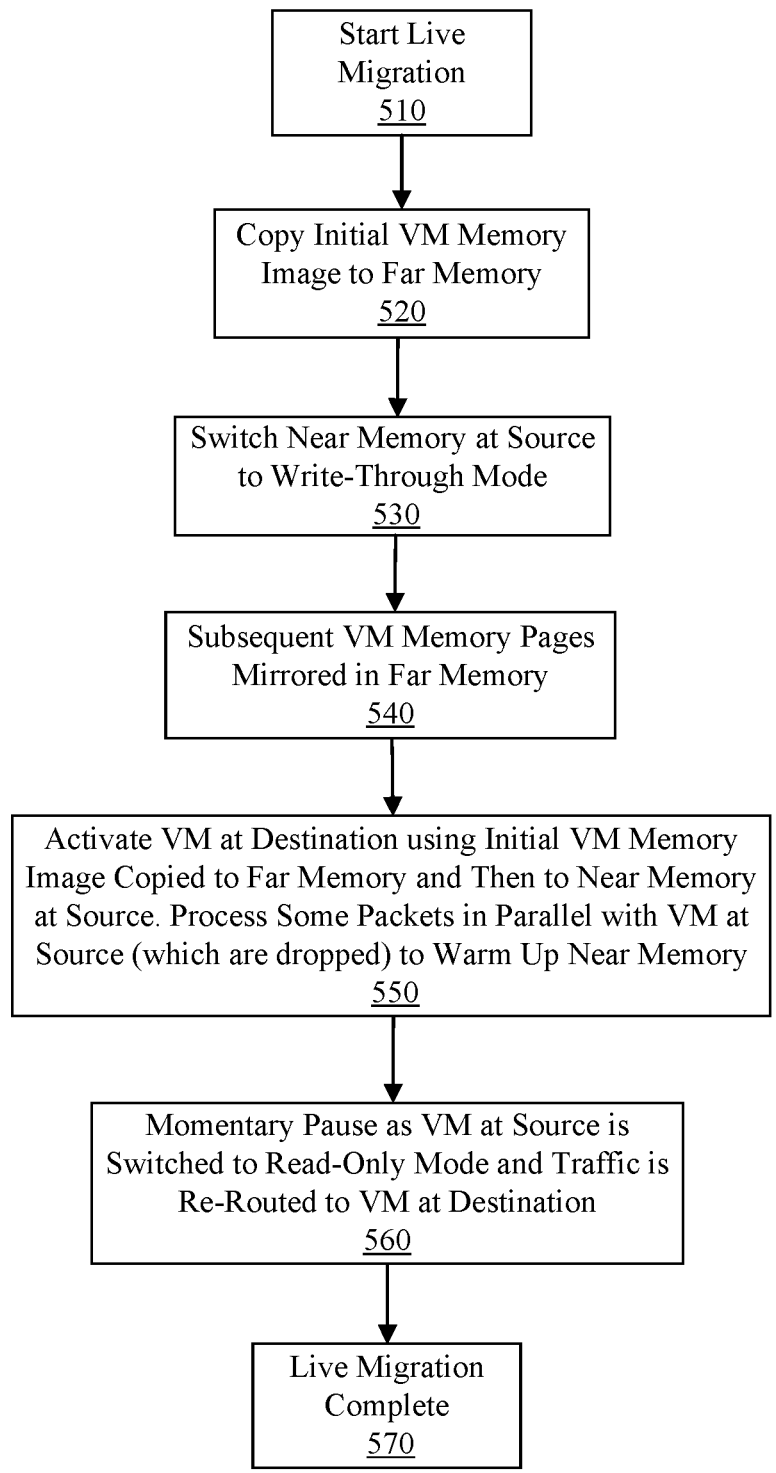
FIG. 5 illustrates an example second VM flow.

FIG. 5 illustrates an example VM migration flow 500. In some examples, VM migration flow 500 may depict a logic flow for a VM migration between servers utilizing a 2LM architecture that includes use of near memory located with a compute sled at a source server and use of disaggregated memory as far memory as mentioned above for FIG. 1 and for scheme 400 shown in FIG. 4. For these examples, elements of system 100 such as, but not limited to, source server 110, destination server 120, VM 130-1, migration logic 113/123, compute sleds 140/170, storage sled 160 or resource manager 190 may be associated with and/or may implement at least portions of VM migration flow 500. Although examples are not limited to elements of system 100 being associated with and/or implementing at least portions of VM migration flow 500.

Beginning at block 510, a live migration of VM 130-1 from source server 110 to destination server 120 may be started. In some examples, as mentioned for scheme 200, resource manager 190 and/or management logic for system 100 may determine that VM 130-1 needs to be migrated from source server 110 to destination server 120 (e.g., for load balancing).

Moving to block 520, migration logic 113 may cause initial VM 130-1 memory pages stored in allocation 145-1 of memory 144 to be copied to allocation 165-1 of memory 164 at storage sled 160.

Moving to block 530, migration logic 113 may switch memory 144 serving as near memory to operate in a write-through mode.

Moving to block 540, as mentioned above, the write-through mode enables all writes or changes to VM 130-1 memory pages at memory 144 to be visible in a substantially immediate manner in memory 164 that is serving as far memory via a copying of subsequent VM 130-1 memory page changes. Thus, subsequent VM 130-1 memory page changes caused during the continued execution of VNF App(s) 132-1 at server 110 are mirrored in the far memory of memory 164.

Moving to block 550, migration logic 123 at destination server 120 may receive an indication that VM 130-1 is to be migrated to destination server 120 supported by compute sled 170. Migration logic 123 may also receive an indication that VM 130-1 memory pages have been copied to memory 164 of storage sled 160 in order to send a CPU state to memory 174 of compute sled 170 at destination server 120 for an early activation of VM 130-1. In some examples, the CPU state may be loaded from allocation 175-1 of memory 174 to CPU/core 172-1 and some packets may be processed in parallel at both source server 110 and destination server 120. Prior to the rerouting of data traffic from VM 130-1 executing VNF App(s) 132-1 at source server 110 to VM 130-1 executing VNF App(s) 132-1 destination server 120, packets processed by VNF App(s) 132-1 executed by VM 130-1 at destination server 120 may be dropped.

Moving to block 560, a momentary pause in the execution of VNF App(s) 132-1 by VM 130-1 may occur at source server 110. In some examples, VM 130-1 at source server 110 is switched to a read-only mode (e.g., stop processing data traffic) and the data traffic is re-routed to have VNF App(s) 132-1 executed by VM 130-1 at destination server 120 process packets for the re-routed data traffic. For this example, a hardware coherency protocol may exist to maintain synchronization of changes through the 2LM architecture including near memory 174 and far memory 164 for VM 130-1 memory pages as these memory pages simultaneously change as the live migration is occurring.

Moving to block 570, migration logic 123 may indicate to migration logic 113 that the CPU state has been loaded and data traffic has been re-routed for processing by VNF App(s) 132-1 executed by VM 130-1 at destination server 120. Live migration of VM 130-1 to destination server 120 may now be deemed as completed.

According to some examples, types of Intel® Corporation technology such as, but not limited to, Secure Guard Extension (SGX), VM-based memory encryption (VM-TME), and total memory encryption (TME) may be implemented to provide additional steps of key management to be executed between a VM executing one or more VNF applications at a source server and a VM executing the one or more VNF applications at a destination server to provide data security during a live migration. For these examples, VMs/VNFs may be capable of configuring a secret key into respective memory encryption engines (MEEs) maintained at compute sleds supporting the VMs/VNFs at the source and destination servers to enable far memory encryption.

In some examples, the additional steps may include VMs/VNFs being configured for live migration. These live-migration-configured VMs/VNFs at the source or destination server may use an existing protocol (e.g., transport layer security (TLS) handshake or SGX attestation protocol) that may be run with a secure enclave of each of the VMs/VNFs. The secure enclave may prevent exposure of a key exchange, credentials and secret key generation from a non-secure access. The secure enclave may be configured with appropriate security credentials using, for example, SGX attestation protocols, the secure enclave may also use these security credentials for live migration encryption key generation. These generated keys may also act as the "authorization" for performing live migration.

According to some examples, the additional steps may also include the VMs/VNFs configuring the secret key into MEEs. The MEEs may be in a memory controller at the compute sled and within a CPU/core processor package boundary in order to maintain SGX and TME security properties according to Intel Corporation's SGX technology.

In some alternative examples, a live migration may allow for a (pre-)configure of impacted secure enclaves with a pre-shared key between VMs/VNFs enclaves that need to be live migrated. This pre-shared key may be delivered as part of an SGX attestation protocol or may be delivered as part of an SDN live migration flow.

According to some other alternative examples, a conversed security and manageability (CSME)/management engine (ME) may perform out of band key management through a central secure server and provision SGX encryption and TME key securely into an MEE maintained at a compute sled. In certain operator/service provider deployments, this may be done using a secure out of band management network that may be dedicated for secure platform provisioning.

Figure 6:
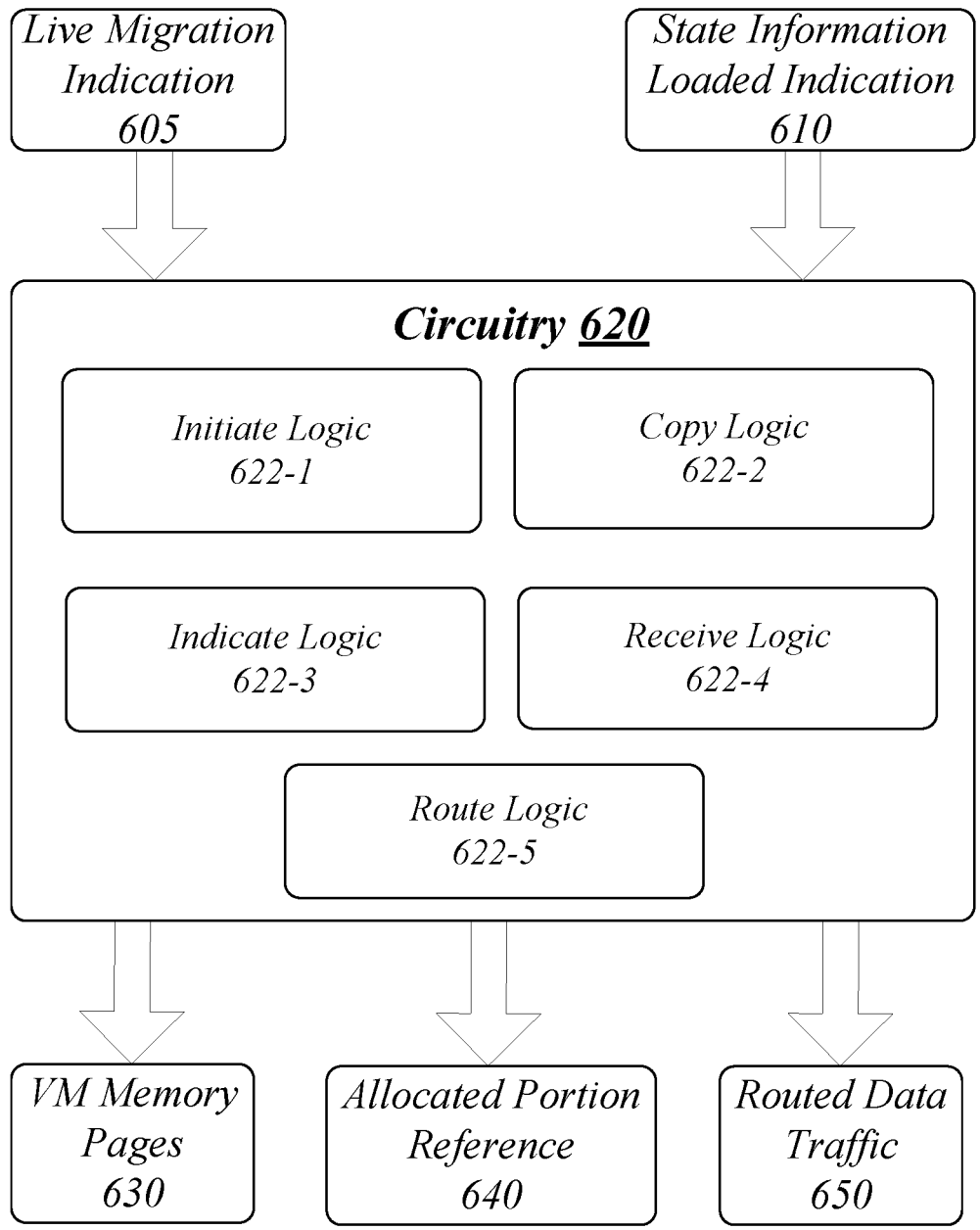
FIG. 6 illustrates an example block diagram for a first apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be associated with logic and/or features of a VMM (e.g., migration logic 113 of VMM 112 as shown in FIG. 1) and may be supported by circuitry 620. For these examples, circuitry 620 may be incorporated within circuitry, processor circuitry, processing element, CPU or core maintained at a source server (e.g., part of compute sled 140 as shown in FIG. 1). Circuitry 620 may be arranged to execute one or more software, or firmware or hardware implemented modules, components or logic 622-a. Module, component or logic may be used interchangeably in this context. It is worthy to note that "a" and "b" and "c" and similar designators as used herein are intended to be variables representing any positive integer. Thus, for example, if an implementation sets a value for a=5, then a complete set software, firmware and/or hardware for logic 622-a may include logic 622-1, 622-2, 622-3, 622-4 or 622-5. The examples presented are not limited in this context and the different variables used throughout may represent the same or different integer values. Also, "logic", "module" or "component" may also include software/firmware stored in computer-readable media, and although the types of logic are shown in FIG. 6 as discrete boxes, this does not limit these components to storage in distinct computer-readable media components (e.g., a separate memory, etc.).

According to some examples, circuitry 620 may include a processor, processor circuit, processor circuitry, processor element, core or CPU. Circuitry 620 may be generally arranged to execute or implement one or more modules, components or logic 622-a. Circuitry 620 may be all or at least a portion of any of various commercially available processors, including without limitation an Intel® Atom®, Celeron®, Core (2) Duo®, Core i3, Core i5, Core i7, Itanium®, Pentium®, Xeon®, Xeon Phi® and XScale® processors; and similar processors. According to some examples, circuitry 620 may also include an application specific integrated circuit (ASIC) and at least some logic 622-a may be implemented as hardware elements of the ASIC. According to some examples, circuitry 620 may also include a field programmable gate array (FPGA) and at least some logic 622-a may be implemented as hardware elements of the FPGA.

According to some examples, apparatus 600 may include initiate logic 622-1. Initiate logic 622-1 may be executed or implemented by circuitry 620 to initiate a live migration of a VM supported by one or more first processing elements having an allocated portion of a first memory. For these examples, the one or more first processing elements and the first memory may be hosted by the source server. The live migration may cause the VM to be supported by one or more second processing elements having an allocated portion of a second memory. The one or more second processing elements and the second memory may be hosted by a destination server. The indication of the live migration may be included in live migration indication 605. In one example, live migration indication 605 may be sent by a resource manager of a datacenter that includes the source and destination servers for load balancing purposes.

In some examples, apparatus 600 may include copy logic 622-2. Copy logic 622-2 may be executed or implemented by circuitry 620 to copy VM memory pages to an allocated portion of a third memory. For these examples, the VM memory pages may be associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. In some examples, VM memory pages 630 may include the VM memory pages to be copied to the third memory.

According to some examples, copy logic 622-2 may also activate a write-through mode to enable subsequent VM memory pages changes maintained in the first memory serving as near memory for the one or more first processing elements to be to be copied to the third memory and then copied to the second memory serving as near memory for the one or more second processing elements. For these examples, a write-through mode may be activated in high performance situations to enable a migrated VM to ramp up an executing application at the destination server, jointly process data traffic at the source and destination servers while the application ramps up (e.g., critical structures copied to the second memory), and then cause data traffic destined for the application to be routed to the only destination server.

According to some examples, apparatus 600 may include Indicate logic 622-3. Indicate logic 622-3 may be executed or implemented by circuitry 620 to indicate to the destination server that the VM memory pages have been copied to the allocated portion of the third memory to cause the VM memory pages to be copied to the allocated portion of the second memory. For these examples, the VM memory pages may include state information for use by the one or more second processing elements to support the VM's execution of the application. In some examples, allocated portion reference 640 may be the indication that the VM memory pages have been copied to the allocated portion of the third memory. Allocated portion reference 640 may include a reference to the allocated portion of the third memory to which the VM memory pages have been copied.

In some examples, apparatus 600 may include receive logic 622-4. Receive logic 622-4 may be executed or implemented by circuitry 620 to receive an indication that the state information has been used to load a processing state to enable the one or more second processing elements to support the VM's execution of the application. For these examples, the indication may be included in state information loaded indication 610.

According to some examples, apparatus 600 may include route logic 622-5. Route logic 622-5 may be executed or implemented by circuitry 620 to cause data traffic to be routed for processing by the application executed by the VM supported by the one or more second processing elements. For these examples, routed data traffic 650 may include information to cause the data traffic to be routed to the destination server for processing.

Various components of apparatus 600 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 7 illustrates an example of a logic flow 700. Logic flow 700 may be representative of some or all of the operations executed by one or more logic, features, or devices described herein, such as apparatus 600. More particularly, logic flow 700 may be implemented by at least initiate logic 622-1, copy logic 622-2, indicate logic 622-3, receive logic 622-4 or route logic 622-5.

According to some examples, logic flow 700 at block 702 may initiate a live migration of a VM supported by one or more first processing elements having an allocated portion of a first memory, the one or more first processing elements and the first memory hosted by the source server, the live migration to cause the VM to be supported by one or more second processing elements having an allocated portion of a second memory, the one or more second processing elements and the second memory hosted by a destination server. For these examples, initiate logic 622-1 may initiate the live migration.

In some examples, logic flow 700 at block 704 may copy VM memory pages to an allocated portion of a third memory, the VM memory pages associated with the VM executing an application while supported by the one or more first processing elements, the third memory arranged to serve as a far memory to the one or more first processing elements and the one or more second processing elements while the first and second memories are arranged to serve as respective near memories for respective one or more first and second processing elements. For these examples, copy logic 622-2 may copy the VM memory pages to the allocated portion of the third memory.

According to some examples, logic flow 700 at block 706 may indicate to the destination server that the VM memory pages have been copied to the allocated portion of the third memory to cause the VM memory pages to be copied to the allocated portion of the second memory, the VM memory pages including state information for use by the one or more second processing elements to support the VM's execution of the application at the destination server. For these examples, indicate logic 622-3 may indicate to the destination server.

In some examples, logic flow 700 at block 708 may receive an indication that the state information has been used to load a processing state to enable the one or more second processing elements to support the VM's execution of the application. For these examples, receive logic 622-4 may receive the indication.

According to some examples, logic flow 700 at block 710 may cause data traffic to be routed for processing by the application executed by the VM supported by the one or more second processing elements. For these examples, route logic 622-5 may cause the data traffic to be route for processing by the application.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
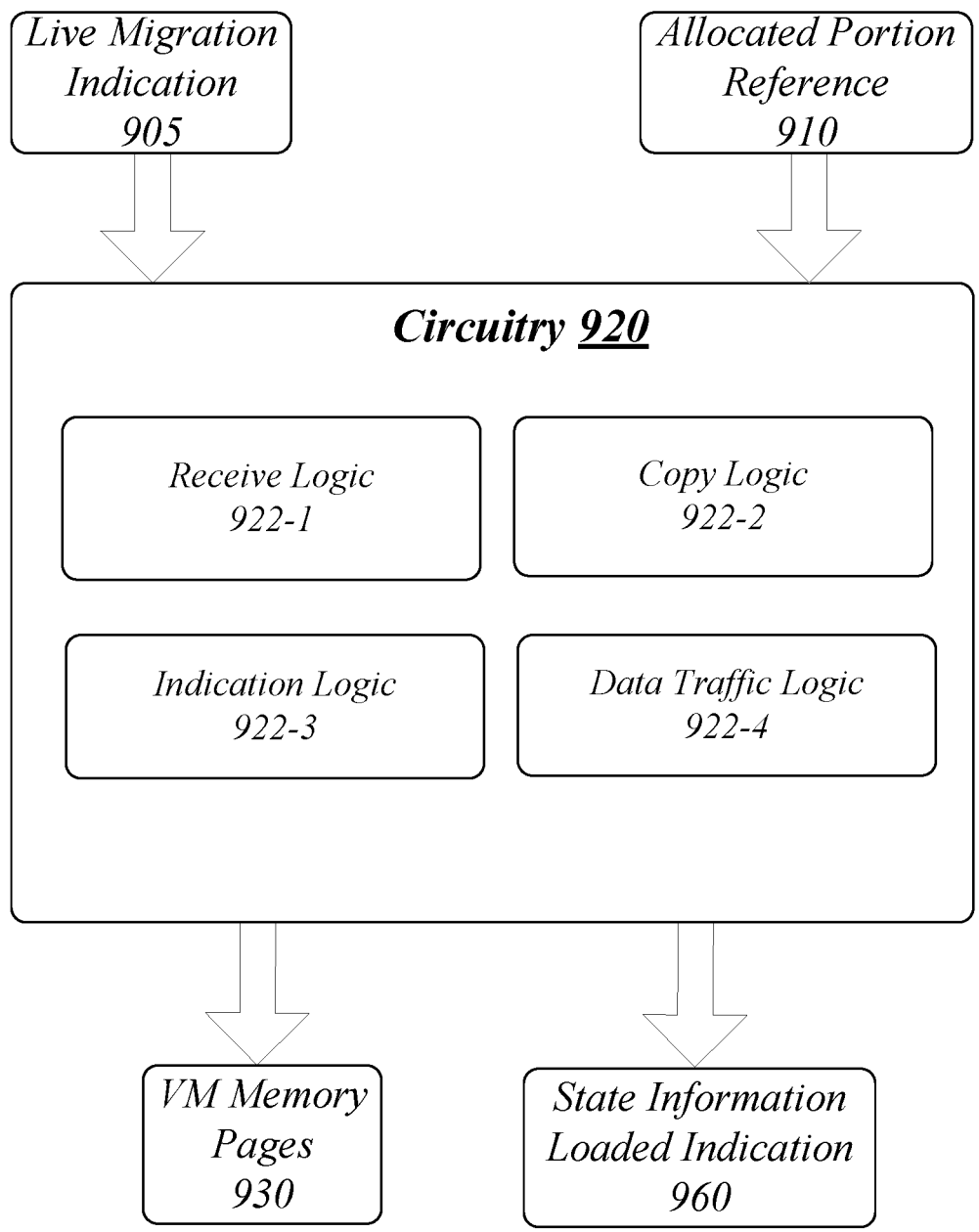
FIG. 9 illustrates an example block diagram for a second apparatus.

FIG. 9 illustrates an example block diagram for an apparatus 900. Although apparatus 900 shown in FIG. 9 has a limited number of elements in a certain topology, it may be appreciated that the apparatus 900 may include more or less elements in alternate topologies as desired for a given implementation.

According to some examples, apparatus 900 may be associated with logic and/or features of a VMM (e.g., migration logic 123 of VMM 122 as shown in FIG. 1) and may be supported by circuitry 920. For these examples, circuitry 920 may be incorporated within circuitry, processor circuitry, processing element, CPU or core maintained at a destination server (e.g., part of compute sled 170 as shown in FIG. 1). Circuitry 920 may be arranged to execute one or more software, firmware or hardware implemented modules, components or logic 922-*a*. Module, component or logic may be used interchangeably in this context. It is worthy to note that "a" and "b" and "c" and similar designators as used herein are intended to be variables representing any positive integer. Thus, for example, if an implementation sets a value for a=5, then a complete set software, firmware and/or hardware for logic 922-*a* may include logic 922-1, 922-2, 922-3, 922-4 or 922-5. The examples presented are not limited in this context and the different variables used throughout may represent the same or different integer values. Also, "logic", "module" or "component" may also include software/firmware stored in computer-readable media, and although the types of logic are shown in FIG. 9 as discrete boxes, this does not limit these components to storage in distinct computer-readable media components (e.g., a separate memory, etc.).

According to some examples, circuitry 920 may include a processor, processor circuit or processor circuitry. Circuitry 920 may be generally arranged to execute or implement one or more modules, components or logic 922-*a*. Circuitry 920 may be all or at least a portion of any of various commercially available processors to include but not limited to the processors mentioned above for apparatus 900. Also, according to some examples, circuitry 920 may also be an ASIC and at least some logic 922-*a* may be implemented as hardware elements of the ASIC. According to some examples, circuitry 920 may also include an FPGA and at least some logic 922-*a* may be implemented as hardware elements of the FPGA.

In some examples, apparatus 900 may include receive logic 922-1. Receive logic 922-1 may be executed or implemented by circuitry 920 to receive, at a destination server, an indication from a source server that a live migration has been initiated to cause a VM supported by one or more first processing elements having an allocated portion of a first memory. For these examples, the one or more first processing elements and the first memory may be hosted by the source server. The live migration may cause the VM to be supported by one or more second processing elements having an allocated portion of a second memory. The one or more second processing elements and the second memory may be hosted by the destination server. According to some examples, the indication of the live migration may be included in live migration indication 905. In one example, live migration indication 905 may be sent by a resource manager of a datacenter that includes the source and destination servers for load balancing purposes.

According to some examples, apparatus 900 may include copy logic 922-2. Copy logic 922-2 may be executed or implemented by circuitry 920 to receive a reference to an allocated portion of a third memory to which VM memory pages have been copied from the allocated portion of the first memory. For these examples, the VM memory pages may be associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. In some examples, allocation portion reference 910 may include the reference to the allocated portion of the third memory.

According to some examples, copy logic 922-2 may cause the VM memory pages to be copied to the allocated portion of the second memory. For these examples, the VM memory pages may include state information for use by the one or more second processing elements to support the VM's execution of the application. In some examples, VM memory pages 930 may include the copied VM memory pages.

In some examples, apparatus 900 may include indication logic 922-3. Indication logic 922-3 may be executed or implemented by circuitry 920 to cause an indication to be sent to the source server that the state information has been used to load a processing state to enable the one or more second processing elements to support the VM's execution of the application. For these examples, state information loaded indication 960 may include the indication that the state information has been used to load the processing state.

According to some examples, apparatus 900 may include data traffic logic 922-4. Data traffic logic 922-4 may be executed or implemented by circuitry 920 to cause data traffic to be received for processing by the application executed by the VM supported by the one or more second processing elements.

Various components of apparatus 900 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

FIG. 10 illustrates an example of a logic flow 1000. Logic flow 1000 may be representative of some or all of the operations executed by one or more logic, features, or devices described herein, such as apparatus 900. More particularly, logic flow 1000 may be implemented by at least receive logic 922-1, copy logic 922-2, indication logic 922-3 or data traffic logic 922-4.

According to some examples, logic flow 1000 at block 1002 may receive, at a destination server, an indication from a source server that a live migration has been initiated to cause a VM supported by one or more first processing elements having an allocated portion of a first memory, the one or more first processing elements and the first memory hosted by the source server, the live migration to cause the VM to be supported by one or more second processing elements having an allocated portion of a second memory, the one or more second processing elements and the second memory hosted by the destination server. For these examples, receive logic 922-1 may receive the indication.

In some examples, logic flow 1000 at block 1004 may receive a reference to an allocated portion of a third memory to which VM memory pages have been copied from the allocated portion of the first memory, the VM memory pages associated with the VM executing an application while supported by the one or more first processing elements, the third memory arranged to serve as a far memory to the one or more first processing elements and the one or more second processing elements while the first and second memories are arranged to serve as respective near memories for respective one or more first and second processing elements. For these examples, copy logic 922-2 may receive the reference to the allocated portion of the third memory.

According to some examples, logic flow 1000 at block 1006 may cause the VM memory pages to be copied to the allocated portion of the second memory, the VM memory pages including state information for use by the one or more second processing elements to support the VM's execution of the application. For these examples, copy logic 922-1 may cause the VM memory pages to be copied to the allocated portion of the second memory.

In some examples, logic flow 1000 at block 1008 may cause an indication to be sent to the source server that the state information has been used to load a processing state to enable the one or more second processing elements to support the VM's execution of the application. For these examples, indication logic 922-3 may cause the indication to be sent to the source server.

According to some examples, logic flow 1000 at block 1010 may cause data traffic to be received for processing by the application executed by the VM supported by the one or more second processing elements. For these examples, data traffic logic 922-4 may cause the data traffic to be received for processing.

FIG. 11 illustrates an example of a storage medium 1100. Storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
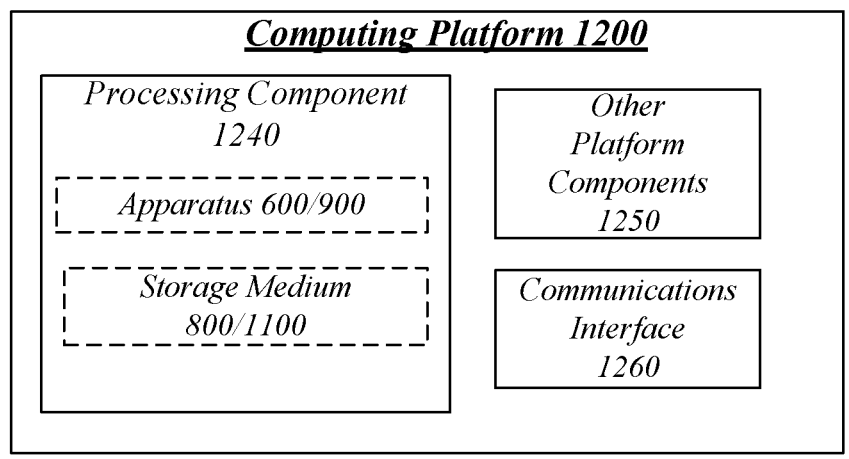
FIG. 12 illustrates an example computing platform.

FIG. 12 illustrates an example computing platform 1200. In some examples, as shown in FIG. 12, computing platform 1200 may include a processing component 1240, other platform components 1250 or a communications interface 1260. According to some examples, computing platform 1200 may be implemented in a server. The server may be capable of coupling through a network to other servers and may be part of a datacenter including a plurality of network connected servers arranged to host one or more compute sleds arranged to support VMs or arranged to host one or more storage sleds.

According to some examples, processing component 1240 may execute processing operations or logic for apparatus 600/900 and/or storage medium 800/1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1200 may be implemented in a server of a datacenter. Accordingly, functions and/or specific configurations of computing platform 1200 described herein, may be included or omitted in various embodiments of computing platform 1200, as suitably desired for a server deployed in a datacenter.

The components and features of computing platform 1200 may be implemented using any combination of discrete circuitry, ASICs, logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry and logic for execution by the circuitry. The logic may initiate a live migration of a VM supported by one or more first processing elements having an allocated portion of a first memory. The one or more first processing elements and the first memory may be hosted by a source server. The live migration may cause the VM to be supported by one or more second processing elements having an allocated portion of a second memory. The one or more second processing elements and the second memory may be hosted by a destination server. The logic may also copy VM memory pages to an allocated portion of a third memory. The VM memory pages associated with the VM executing an application while supported by the one or more first processing elements. The third memory arranged to serve as a far memory to the one or more first processing elements and the one or more second processing elements while the first and second memories are arranged to serve as respective near memories for respective one or more first and second processing elements. The logic may also indicate to the destination server that the VM memory pages have been copied to the allocated portion of the third memory to cause the VM memory pages to be copied to the allocated portion of the second memory. The VM memory pages may include state information for use by the one or more second processing elements to support the VM's execution of the application.

Example 2

The apparatus of example 1, the logic may also receive an indication that the state information has been used to load a processing state to enable the one or more second processing elements to support the VM's execution of the application. The logic may also cause data traffic to be routed for processing by the application executed by the VM supported by the one or more second processing elements.

Example 3

The apparatus of example 2 may also include the logic to cause a reallocation of the one or more processing elements to support one or more different VMs.

Example 4

The apparatus of example 2 may also include the logic to activate a write-through mode to enable subsequent VM memory pages changes maintained in the first memory serving as near memory for the one or more first processing elements to be to copied to the third memory and then copied to the second memory serving as near memory for the one or more second processing elements. For this example, the logic may also, responsive to receipt of the indication that the state information has been used to load the processing state, cause the data traffic to be jointly routed to the source server and the destination server for processing by the application executed by the VM supported by the one or more first and second processing elements. The logic may also receive an indication to stop processing the data traffic by the application executed by the VM supported by the one or more first processing elements; and cause the data traffic for processing by the application to be rerouted to only the destination server.

Example 5

The apparatus of example 4, the indication to stop processing the data traffic may be based on VM memory pages and subsequent VM memory pages being copied to the allocated portion of the second memory such that critical structures of the application are copied to enable processing of the data traffic by the application executed by the VM supported by the one or more second processing elements.

Example 6

The apparatus of example 1, the one or more first processing elements and the first memory may be resident on a first compute sled hosted by the source server. The one or more second processing elements and the second memory may be resident on a second compute sled hosted by the destination server.

Example 7

The apparatus of example 6, the third memory may be resident on a storage sled communicatively coupled with the first compute sled and the second compute sled via a network connection. For this example, the storage sled may be located in a different physical location in relation to the source server hosting the first compute sled or the destination server hosting the second compute sled.

Example 8

The apparatus of example 7, the different physical location may include a separate rack of a same cabinet or a separate cabinet from among a plurality of cabinets.

Example 9

The apparatus of example 1, the application may include a VNF application. For this example, the state information included in the VM memory pages may reflect a state of the VM while executing the VNF application to fulfill a workload as part of providing a network service.

Example 10

The apparatus of example 9, the network service may include a database network service, a website hosting network service, a routing network service, an e-mail network service, a firewalling service, a DNS, a caching service, a NAT service or virus scanning network service.

Example 11

The apparatus of example 1, the first and second memories comprising volatile types of memory including DRAM or SRAM.

Example 12

The apparatus of example 11, the third memory may include a byte or a block addressable non-volatile memory having a 3-D cross-point memory structure that includes chalcogenide phase change material.

Example 13

The apparatus of example 11, the third memory may include byte or block addressable non-volatile memory including multi-threshold level NAND flash memory, NOR flash memory, single or multi-level PCM, resistive memory, nanowire memory, FeTRAM, MRAM that incorporates memristor technology or STT-MRAM.

Example 14

The apparatus of example 1 may also include a digital display coupled to the circuitry to present a user interface view.

Example 15

An example method may include initiating, at a source server, a live migration of a VM supported by one or more first processing elements having an allocated portion of a first memory. The one or more first processing elements and the first memory may be hosted by the source server, the live migration to cause the VM to be supported by one or more second processing elements having an allocated portion of a second memory. The one or more second processing elements and the second memory may be hosted by a destination server. The method may also include copying VM memory pages to an allocated portion of a third memory. The VM memory pages may be associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. The method may also include indicating to the destination server that the VM memory pages have been copied to the allocated portion of the third memory to cause the VM memory pages to be copied to the allocated portion of the second memory. The VM memory pages may include state information for use by the one or more second processing elements to support the VM's execution of the application at the destination server.

Example 16

The method of example 15 may also include receiving an indication that the state information has been used to load a processing state to enable the one or more second processing elements to support the VM's execution of the application at the destination server. The method may also include causing data traffic to be routed for processing by the application executed by the VM supported by the one or more second processing elements.

Example 17

The method of example 15 may also include reallocating the one or more processing elements to support a different VM.

Example 18

The method of example 15 may also include activating a write-through mode to enable subsequent VM memory pages changes maintained in the first memory serving as near memory for the one or more first processing elements to be to copied to the third memory and then copied to the second memory serving as near memory for the one or more second processing elements. The method may also include, responsive to receiving the indication that the state information has been used to load the processing state, causing the data traffic to be jointly routed to the source server and the destination server for processing by the application executed by the VM supported by the one or more first and second processing elements. The method may also include receiving an indication to stop processing the data traffic by the application executed by the VM supported by the one or more first processing elements. The method may also include causing the data traffic for processing by the application to be rerouted to only the destination server.

Example 19

The method of example 18 may also include the indication to stop processing the data traffic is based on VM memory pages and subsequent VM memory pages being copied to the allocated portion of the second memory such that critical structures of the application are copied to enable processing of the data traffic by the application executed by the VM supported by the one or more second processing elements.

Example 20

The method of example 15, the one or more first processing elements and the first memory may reside on a first compute sled hosted by the source server. The one or more second processing elements and the second memory may reside on a second compute sled hosted by the destination server.

Example 21

The method of example 20, the third memory may be resident on a storage sled communicatively coupled with the first compute sled and the second compute sled via a network connection. For this example, the storage sled may be located in a different physical location in relation to the source server hosting the first compute sled or the destination server hosting the second compute sled.

Example 22

The method of example 20, the different physical location may be a separate rack of a same cabinet or a separate cabinet from among a plurality of cabinets.

Example 23

The method of example 15, the application may be a VNF application. For this example, the state information included in the VM memory pages may reflect a state of the VM while executing the VNF application to fulfill a workload as part of providing a network service.

Example 24

The method of example 23, the network service may be a database network service, a website hosting network service, a routing network service, an e-mail network service, a firewalling service, a DNS, a caching service, a NAT service or virus scanning network service.

Example 25

The method of example 15, the first and second memories may be volatile types of memory including DRAM or SRAM.

Example 26

The method of example 25, the third memory may be a byte or a block addressable non-volatile memory having a 3-D cross-point memory structure that includes chalcogenide phase change material.

Example 27

The method of example 25, the third memory may be byte or block addressable non-volatile memory including multi-threshold level NAND flash memory, NOR flash memory, single or multi-level PCM, resistive memory, nanowire memory, FeTRAM, MRAM that incorporates memristor technology or STT-MRAM.

Example 28

At least one machine readable medium may include a plurality of instructions that in response to being executed by a system may cause the system to carry out a method according to any one of examples 15 to 27.

Example 29

An apparatus may include means for performing the methods of any one of examples 15 to 28.

Example 30

An example method may include receiving, at a destination server, an indication from a source server that a live migration has been initiated to cause a VM supported by one or more first processing elements having an allocated portion of a first memory. The one or more first processing elements and the first memory may be hosted by the source server. The live migration may cause the VM to be supported by one or more second processing elements having an allocated portion of a second memory. The one or more second processing elements and the second memory may be hosted by the destination server. The method may also include receiving a reference to an allocated portion of a third memory to which VM memory pages have been copied from the allocated portion of the first memory. The VM memory pages associated with the VM executing an application while supported by the one or more first processing elements. The third memory arranged to serve as a far memory to the one or more first processing elements and the one or more second processing elements while the first and second memories are arranged to serve as respective near memories for respective one or more first and second processing elements. The method may also include copying the VM memory pages to the allocated portion of the second memory. The VM memory pages may include state information for use by the one or more second processing elements to support the VM's execution of the application. The method may also include sending an indication to the source server that the state information has been used to load a processing state to enable the one or more second processing elements to support the VM's execution of the application. The method may also include receiving data traffic for processing by the application executed by the VM supported by the one or more second processing elements.

Example 31

The method of example 30, the one or more first processing elements and the first memory may be resident on a first compute sled hosted by the source server. The one or more second processing elements and the second memory may be resident on a second compute sled hosted by the destination server.

Example 32

The method of example 31, the third memory may be resident on a storage sled communicatively coupled with the first compute sled and the second compute sled via a network connection. For this example, the storage sled may be located in a different physical location in relation to the source server hosting the first compute sled or the destination server hosting the second compute sled.

Example 33

The method of example 32, the different physical location may include a separate rack of a same cabinet or a separate cabinet from among a plurality of cabinets.

Example 34

The method of example 30, the application may be a VNF application. For this example, the state information included in the VM memory pages may reflect a state of the VM while executing the VNF application to fulfill a workload as part of providing a network service.

Example 35

The method of example 30, the network service may be a database network service, a website hosting network service, a routing network service, an e-mail network service, a firewalling service, a DNS, a caching service, a NAT service or virus scanning network service.

Example 36

The method of example 30, the first and second memories may be volatile types of memory including DRAM or SRAM.

Example 37

The method of example 36, the third memory may be a byte or a block addressable non-volatile memory having a 3-D cross-point memory structure that includes chalcogenide phase change material.

Example 38

The method of example 36, the third memory may be byte or block addressable non-volatile memory including multi-threshold level NAND flash memory, NOR flash memory, single or multi-level PCM, resistive memory, nanowire memory, FeTRAM, MRAM that incorporates memristor technology or STT-MRAM.

Example 39

At least one machine readable medium may include a plurality of instructions that in response to being executed by a system may cause the system to carry out a method according to any one of examples 30 to 38.

Example 40

An apparatus may include means for performing the methods of any one of examples 30 to 38.

Example 41

At least one machine readable medium may include a plurality of instructions that in response to being executed by a system may cause the system to receive, at a destination server, an indication from a source server that a live migration has been initiated to cause a VM supported by one or more first processing elements having an allocated portion of a first memory. The one or more first processing elements and the first memory may be hosted by the source server. The live migration may cause the VM to be supported by one or more second processing elements having an allocated portion of a second memory. The one or more second processing elements and the second memory may be resident hosted by the destination server. The instructions may also cause the system to receive a reference to an allocated portion of a third memory to which VM memory pages have been copied from the allocated portion of the first memory. The VM memory pages may be associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. The instructions may also cause the system to cause the VM memory pages to be copied to the allocated portion of the second memory. The VM memory pages may include state information for use by the one or more second processing elements to support the VM's execution of the application. The instructions may also cause the system to cause an indication to be sent to the source server that the state information has been used to load a processing state to enable the one or more second processing elements to support the VM's execution of the application at the destination server. The instructions may also cause the system to cause data traffic to be received for processing by the application executed by the VM supported by the one or more second processing elements.

Example 42

The at least one machine readable medium of example 41, the one or more first processing elements and the first memory may be resident on a first compute sled hosted by the source server. The one or more second processing elements and the second memory may be resident on a second compute sled hosted by the destination server.

Example 43

The at least one machine readable medium of example 41, the third memory may be resident on a storage sled communicatively coupled with the first compute sled and the second compute sled via a network connection. For this example, the storage sled located in a different physical location in relation to the source server hosting the first compute sled or the destination server hosting the second compute sled.

Example 44

The at least one machine readable medium of example 43, the different physical location may include a separate rack of a same cabinet or a separate cabinet from among a plurality of cabinets.

Example 45

The at least one machine readable medium of example 41, the application may be a VNF application. For this example, the state information included in the VM memory pages may reflect a state of the VM while executing the VNF application to fulfill a workload as part of providing a network service.

Example 46

The at least one machine readable medium of example 45, the network service may be a database network service, a website hosting network service, a routing network service, an e-mail network service, a firewalling service, a DNS, a caching service, a NAT service or virus scanning network service.

Example 47

The at least one machine readable medium of example 41, the first and second memories may be volatile types of memory including DRAM or SRAM.

Example 48

The at least one machine readable medium of example 47, the third memory may be a byte or a block addressable non-volatile memory having a 3-D cross-point memory structure that includes chalcogenide phase change material.

Example 49

The at least one machine readable medium of example 47, the third memory may be byte or block addressable non-volatile memory including multi-threshold level NAND flash memory, NOR flash memory, single or multi-level PCM, resistive memory, nanowire memory, FeTRAM, MRAM that incorporates memristor technology or STT-MRAM.

Example 50

An example apparatus may include means for initiating, at a source server, a live migration of a VM supported by one or more first processing elements having an allocated portion of a first memory. The one or more first processing elements and the first memory may be hosted by the source server. The live migration may cause the VM to be supported by one or more second processing elements having an allocated portion of a second memory. The one or more second processing elements and the second memory may be hosted by a destination server. The apparatus may also include means for copying VM memory pages to an allocated portion of a third memory, the VM memory pages associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. The apparatus may also include means for indicating to the destination server that the VM memory pages have been copied to the allocated portion of the third memory to cause the VM memory pages to be copied to the allocated portion of the second memory. The VM memory pages may include state information for use by the one or more second processing elements to support the VM's execution of the application at the destination server.

Example 51

The apparatus of example 50 may also include means for receiving an indication that the state information has been used to load a processing state to enable the one or more second processing elements to support the VM's execution of the application. The apparatus may also include means for causing data traffic to be routed for processing by the application executed by the VM supported by the one or more second processing elements.

Example 52

The apparatus of example 51 may also include means for reallocating the one or more processing elements to support a different VM.

Example 53

An example apparatus may include means for receiving, at a destination server, an indication from a source server that a live migration has been initiated to cause a VM supported by one or more first processing elements having an allocated portion of a first memory. The one or more first processing elements and the first memory may be hosted by the source server. The live migration may cause the VM to be supported by one or more second processing elements having an allocated portion of a second memory. The one or more second processing elements and the second memory may be hosted by the destination server. The apparatus may also include means for receiving a reference to an allocated portion of a third memory to which VM memory pages have been copied from the allocated portion of the first memory. The VM memory pages may be associated with the VM executing an application while supported by the one or more first processing elements. The third memory may be arranged to serve as a far memory to the one or more first processing elements and the one or more second processing elements while the first and second memories are arranged to serve as respective near memories for respective one or more first and second processing elements. The apparatus may also include means for copying the VM memory pages to the allocated portion of the second memory. The VM memory pages may include state information for use by the one or more second processing elements to support the VM's execution of the application. The apparatus may also include means for sending an indication to the source server that the state information has been used to load a processing state to enable the one or more second processing elements to support the VM's execution of the application. The apparatus may also include means for receiving data traffic for processing by the application executed by the VM supported by the one or more second processing elements.

Example 54

The apparatus of example 53, the one or more first processing elements and the first memory may be resident on a first compute sled hosted by the source server. Also, the one or more second processing elements and the second memory may be resident on a second compute sled hosted by the destination server.

Example 55

The apparatus of example 54, the third memory may be resident on a storage sled communicatively coupled with the first compute sled and the second compute sled via a network connection. The storage sled may be located in a different physical location in relation to the source server hosting the first compute sled or the destination server hosting the second compute sled.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry; and
   logic for execution by the circuitry to:
      initiate a live migration of a virtual machine (VM) supported by one or more first processing elements having an allocated portion of a first memory, the one or more first processing elements and the first memory hosted by a source server, the live migration to cause the VM to be supported by one or more second processing elements having an allocated portion of a second memory, the one or more second processing elements and the second memory hosted by a destination server;
      copy VM memory pages to an allocated portion of a third memory, the VM memory pages to include operating state information for the VM to execute an application while supported by the one or more first processing elements, the third memory arranged to serve as a far memory to the one or more first processing elements and the one or more second processing elements while the first and second memories are arranged to serve as respective near memories for respective one or more first and second processing elements; and
      indicate to the destination server that the VM memory pages have been copied to the allocated portion of the third memory to cause the VM memory pages to be copied to the allocated portion of the second memory, the one or more second processing elements to use the operating state information included in the VM memory pages to support the VM's execution of the application, wherein the first and second memories are volatile types of memory that includes dynamic random access memory (DRAM) or static random access memory (SRAM) and the third memory is a byte or a block addressable non-volatile memory having a 3-dimensional (3-D) cross-point memory structure that includes chalcogenide phase change material.

2. The apparatus of claim 1, further comprising the logic to:
   receive an indication that the operating state information has been used to load a processing state to enable the one or more second processing elements to support the VM's execution of the application; and
   cause data traffic to be routed for processing by the application executed by the VM supported by the one or more second processing elements.

3. The apparatus of claim 2, further comprising the logic to:
   cause a reallocation of the one or more processing elements to support one or more different VMs.

4. The apparatus of claim 2, further comprising the logic to:
   activate a write-through mode to enable subsequent VM memory page changes maintained in the first memory serving as near memory for the one or more first processing elements to be to copied to the third memory and then copied to the second memory serving as near memory for the one or more second processing elements;
   responsive to receipt of the indication that the operating state information has been used to load the processing state, cause the data traffic to be jointly routed to the source server and the destination server for processing by the application executed by the VM supported by the one or more first and second processing elements;
   receive an indication to stop processing the data traffic by the application executed by the VM supported by the one or more first processing elements; and
   cause the data traffic for processing by the application to be rerouted to only the destination server.

5. The apparatus of claim 4, comprising the indication to stop processing the data traffic is based on VM memory pages and subsequent VM memory pages being copied to the allocated portion of the second memory such that critical structures of the application are copied to enable processing of the data traffic by the application executed by the VM supported by the one or more second processing elements.

6. The apparatus of claim 1, comprising:
   the one or more first processing elements and the first memory resident on a first compute sled hosted by the source server; and
   the one or more second processing elements and the second memory resident on a second compute sled hosted by the destination server.

7. The apparatus of claim 6, comprising the third memory resident on a storage sled communicatively coupled with the first compute sled and the second compute sled via a network connection, the storage sled located in a different physical location in relation to the source server hosting the first compute sled or the destination server hosting the second compute sled.

8. The apparatus of claim 7, the different physical location comprising a separate rack of a same cabinet or a separate cabinet from among a plurality of cabinets.

9. The apparatus of claim 1, the application comprising a virtual network function (VNF) application, the operating state information included in the VM memory pages to reflect a state of the VM while executing the VNF application to fulfill a workload as part of providing a network service.

10. The apparatus of claim 9, the network service comprising a database network service, a website hosting network service, a routing network service, an e-mail network service, a firewalling service, a domain name service (DNS), a caching service, a network address translation (NAT) service or virus scanning network service.

11. A method comprising:
  initiating, at a source server, a live migration of a virtual machine (VM) supported by one or more first processing elements having an allocated portion of a first memory, the one or more first processing elements and the first memory hosted by the source server, the live migration to cause the VM to be supported by one or more second processing elements having an allocated portion of a second memory, the one or more second processing elements and the second memory hosted by a destination server;
  copying VM memory pages to an allocated portion of a third memory, the VM memory pages to include operating state information for the VM to execute an application while supported by the one or more first processing elements, the third memory arranged to serve as a far memory to the one or more first processing elements and the one or more second processing elements while the first and second memories are arranged to serve as respective near memories for respective one or more first and second processing elements; and
  indicating to the destination server that the VM memory pages have been copied to the allocated portion of the third memory to cause the VM memory pages to be copied to the allocated portion of the second memory, the one or more second processing elements to use the operating state information included in the VM memory pages to support the VM's execution of the application at the destination server, wherein the first and second memories are volatile types of memory that includes dynamic random access memory (DRAM) or static random access memory (SRAM) and the third memory is a byte or a block addressable non-volatile memory having a 3-dimensional (3-D) cross-point memory structure that includes chalcogenide phase change material.

12. The method of claim 11, comprising:
  receiving an indication that the operating state information has been used to load a processing state to enable the one or more second processing elements to support the VM's execution of the application; and
  causing data traffic to be routed for processing by the application executed by the VM supported by the one or more second processing elements.

13. The method of claim 12, further comprising:
  reallocating the one or more processing elements to support a different VM.

14. The method of claim 12, further comprising:
  activating a write-through mode to enable subsequent VM memory pages changes maintained in the first memory serving as near memory for the one or more first processing elements to be to copied to the third memory and then copied to the second memory serving as near memory for the one or more second processing elements;
  responsive to receiving the indication that the operating state information has been used to load the processing state, causing the data traffic to be jointly routed to the source server and the destination server for processing by the application executed by the VM supported by the one or more first and second processing elements;
  receiving an indication to stop processing the data traffic by the application executed by the VM supported by the one or more first processing elements; and
  causing the data traffic for processing by the application to be rerouted to only the destination server.

15. The method of claim 14, comprising the indication to stop processing the data traffic is based on VM memory pages and subsequent VM memory pages being copied to the allocated portion of the second memory such that critical structures of the application are copied to enable processing of the data traffic by the application executed by the VM supported by the one or more second processing elements.

16. The method of claim 11, comprising:
  the one or more first processing elements and the first memory residing on a first compute sled hosted by the source server; and
  the one or more second processing elements and the second memory residing on a second compute sled hosted by the destination server.

17. The method of claim 16, comprising the third memory resident on a storage sled communicatively coupled with the first compute sled and the second compute sled via a network connection, the storage sled located in a different physical location in relation to the source server hosting the first compute sled or the destination server hosting the second compute sled.

18. The method of claim 11, the application comprising a virtual network function (VNF) application, the operating state information included in the VM memory pages to reflect a state of the VM while executing the VNF application to fulfill a workload as part of providing a network service.

19. At least one non-transitory machine readable medium comprising a plurality of instructions that in response to being executed by a system cause the system to:
  receive, at a destination server, an indication from a source server that a live migration has been initiated to cause a virtual machine (VM) supported by one or more first processing elements having an allocated portion of a first memory, the one or more first processing elements and the first memory by the source server, the live migration to cause the VM to be supported by one or more second processing elements having an allocated portion of a second memory, the one or more second processing elements and the second memory hosted by the destination server;
  receive a reference to an allocated portion of a third memory to which VM memory pages have been copied from the allocated portion of the first memory, the VM memory pages to include operating state information for the VM to execute an application while supported by the one or more first processing elements;

cause the VM memory pages to be copied to the allocated portion of the second memory, the one or more second processing elements to support the VM's execution of the application;

cause an indication to be sent to the source server that the state information has been used to load a processing state to enable the one or more second processing elements to use the operating state information included in the VM memory pages to support the VM's execution of the application; and cause data traffic to be received for processing by the application executed by the VM supported by the one or more second processing elements, wherein the first and second memories are volatile types of memory that includes dynamic random access memory (DRAM) or static random access memory (SRAM) and the third memory is a byte or a block addressable non-volatile memory having a 3-dimensional (3-D) cross-point memory structure that includes chalcogenide phase change material.

20. The at least one non-transitory machine readable medium of claim 19, comprising:

the one or more first processing elements and the first memory resident on a first compute sled hosted by the source server; and the one or more second processing elements and the second memory resident on a second compute sled hosted by the destination server.

21. The at least one non-transitory machine readable medium of claim 20, comprising the third memory resident on a storage sled communicatively coupled with the first compute sled and the second compute sled via a network connection, the storage sled located in a different physical location in relation to the source server hosting the first compute sled or the destination server hosting the second compute sled.

22. The at least one non-transitory machine readable medium of claim 21, the different physical location comprising a separate rack of a same cabinet or a separate cabinet from among a plurality of cabinets.

23. The at least one non-transitory machine readable medium of claim 19, the application comprising a virtual network function (VNF) application, the operating state information included in the VM memory pages to reflect a state of the VM while executing the VNF application to fulfill a workload as part of providing a network service.

24. An apparatus comprising:

means for initiating, at a source server, a live migration of a virtual machine (VM) supported by one or more first processing elements having an allocated portion of a first memory, the one or more first processing elements and the first memory hosted by the source server, the live migration to cause the VM to be supported by one or more second processing elements having an allocated portion of a second memory, the one or more second processing elements and the second memory hosted by a destination server;

means for copying VM memory pages to an allocated portion of a third memory, the VM memory pages to include operating state information for the VM to execute an application while supported by the one or more first processing elements, the third memory arranged to serve as a far memory to the one or more first processing elements and the one or more second processing elements while the first and second memories are arranged to serve as respective near memories for respective one or more first and second processing elements; and means for indicating to the destination server that the VM memory pages have been copied to the allocated portion of the third memory to cause the VM memory pages to be copied to the allocated portion of the second memory, the one or more second processing elements to use the operating state information included in the VM memory pages to support the VM's execution of the application at the destination server, wherein the first and second memories are volatile types of memory that includes dynamic random access memory (DRAM) or static random access memory (SRAM) and the third memory is a byte or a block addressable non-volatile memory having a 3-dimensional (3-D) cross-point memory structure that includes chalcogenide phase change material.

25. The apparatus of claim 24, comprising:

means for receiving an indication that the operating state information has been used to load a processing state to enable the one or more second processing elements to support the VM's execution of the application; and means for causing data traffic to be routed for processing by the application executed by the VM supported by the one or more second processing elements.

26. The apparatus of claim 25, further comprising:

means for reallocating the one or more processing elements to support a different VM.

27. At least one non-transitory machine readable medium comprising a plurality of instructions that in response to being executed by a system cause the system to:

initiate, at a source server, a live migration of a virtual machine (VM) supported by one or more first processing elements having an allocated portion of a first memory, the one or more first processing elements and the first memory hosted by the source server, the live migration to cause the VM to be supported by one or more second processing elements having an allocated portion of a second memory, the one or more second processing elements and the second memory hosted by a destination server;

copy VM memory pages to an allocated portion of a shared memory to couple with the host and destination servers, the VM memory pages to include operating state information for the VM to execute an application while supported by the one or more first processing elements; and indicate to the destination server that the VM memory pages have been copied to the allocated portion of the shared memory to cause the VM memory pages to be copied to the allocated portion of the second memory, the one or more second processing elements to use the operating state information included in the VM memory pages to support the VM's execution of the application at the destination server, wherein the first and second memories are volatile types of memory that includes dynamic random access memory (DRAM) or static random access memory (SRAM) and the third memory is a byte or a block addressable non-volatile memory having a 3-dimensional (3-D) cross-point memory structure that includes chalcogenide phase change material.

28. The at least one non-transitory machine readable medium of claim 27, comprising the instructions to further cause the system to:

receive an indication that the operating state information has been used to load a processing state to enable the one or more second processing elements to support the VM's execution of the application; and cause data traffic to be routed for processing by the application executed by the VM supported by the one or more second processing elements.

* * * * *